April 28, 1964    D. A. BENAMY ETAL    3,131,247
SYSTEM FOR SIMULATING LAND MASS RADAR RECEPTION
Filed Sept. 19, 1960    10 Sheets-Sheet 2

INVENTORS
Robert J. Williams
Irving Feinberg
Frank Frozen
Daniel A. Benamy
THEIR ATTORNEY

April 28, 1964   D. A. BENAMY ETAL   3,131,247
SYSTEM FOR SIMULATING LAND MASS RADAR RECEPTION
Filed Sept. 19, 1960   10 Sheets-Sheet 4

INVENTORS
Robert J. Williams
Irving Feinberg
Frank Feorady
Daniel A. Benamy
BY
THEIR ATTORNEY

April 28, 1964 D. A. BENAMY ETAL 3,131,247
SYSTEM FOR SIMULATING LAND MASS RADAR RECEPTION
Filed Sept. 19, 1960 10 Sheets-Sheet 10

Fig. 9D

INVENTORS
Robert J. Williams
Irving Frinberg
Frank Feoran
Daniel A. Benamy
BY
THEIR ATTORNEY

United States Patent Office 3,131,247
Patented Apr. 28, 1964

3,131,247
SYSTEM FOR SIMULATING LAND MASS RADAR
RECEPTION
Daniel A. Benamy, Teaneck, N.J., Irving Feinberg, Bronx,
N.Y., and Frank Feoranz, Saddle Brook, and Robert J.
Williams, Wayne, N.J., assignors to Curtiss-Wright Corporation, a corporation of Delaware
Filed Sept. 19, 1960, Ser. No. 56,868
13 Claims. (Cl. 35—10.4)

This invention concerns a system for simulating the display effects produced by airborne radar return signals from the earth's surface, in particular terrain or "land mass" radar signals.

In operational airborne radar, scanning action by the radar antenna in synchronism with the sweep line motion on the radar indicator produces a map-type display of the terrain beneath the aircraft. Terrain features are represented due to variations in the radio frequency reflectivity characteristics of the earth's surface so that the indicator display presents a pattern that is unique for the scanned area.

For example, where the transmitted line-of-sight radar frequency signals are blocked by a hill or a mountain, shadows appear in the radar indicator display representing those areas that are not then "visible" to the scanning antenna; also the slope of the terrain, target range, altitude of the aircraft and its direction as well as other factors, determine the intensity and character of the return signals so as to modify the display accordingly.

Limited simulation of land mass radar return has heretofore been tried in several ways. An early development known as the Ultrasonic Trainer used a relief map and a relatively movable ultrasonic transducer to represent the airborne radar, all immersed in water so as to set up a three-dimensional analog. This method has severe restrictions as to scale factor, etc. due to practical limitations in apparatus size; also maintenance, radar resolution, temperature variations and characteristics of the water medium, etc. presented serious problems.

Another technique subject to variations was the Light Reflective-Relief Map Method wherein a photoelectric or photographic device was used to pick up reflected light from a three dimensional terrain map. The radiating source was generally a flying spot scanner cathode ray tube or a high intensity point light source that was fixed as to height and focused on the map so that light reflections were picked up by a photosensitive device that in turn was movable vertically to produce altitude effects. In an alternative form, the light source and the photosensitive device were reversed as to position. This method also had severe apparatus restrictions as to scale factor, etc. For example, the details of the relief map had to be reduced to minute size even to represent a 250,000:1 scale; also the size of the photomultiplier tube or light source required was excessive by far in relation to the antenna that was simulated. Excessive installation space was also required for the overhead traveling carriage and gantry.

In accordance with the present invention, an improved land mass radar return simulating system involving combined flying spot scanner, photographic, optical and electronic computer techniques is provided so as to give the training facility the marked advantage of far greater scale factor ratios for a given equipment size and installation area than previously known systems. This is all accomplished with good resolution, together with flexibility of operation, simplified processing of stored data and comparatively low maintenance cost. In a preferred form of the invention, chosen topographical and cultural terrain areas are produced on separate phototransparencies representing the land mass elevation and reflectivity characteristics respectively, of the selected areas. The radar signals represented are produced from a TV type flying spot pick-up system, using however the scanning arrangement of the radar display scope to develop the correct picture. The picture thus formed is in accordance with precise computing techniques for obtaining shadow and other effects so as to represent actual airborne radar surveying the same terrain.

It is therefore a principal object of this invention more realistically to simulate such radar signal return and also to produce an improved system having unusually compact data storage capable of simulating land mass radar return over a very large area, such as a million or more square miles in a single operational "flight"; also to simulate such signal return with comparatively high resolution at scales as great as 5,000,000:1.

Another object of this invention is an improved system of the above character that is not subject to apparatus restrictions for representing variations in aircraft altitude from maximum aircraft capability to ground level, and therefore is useful for training in terrain avoidance as well as ground and contour mapping.

A specific object of the invention is realistic simulation of land mass radar signal return incident to radar pulse characteristics, antenna characteristics, changes in radar terrain reflectivity that are a function of the angle of incidence, shadow conditions and attenuation due to range.

The invention will be more fully set forth in the following description referring to the accompanying drawings and the features of novelty will be pointed out with particularity in the claims annexed to and forming a part of this specification.

Referring to the drawings.

Figure 1:
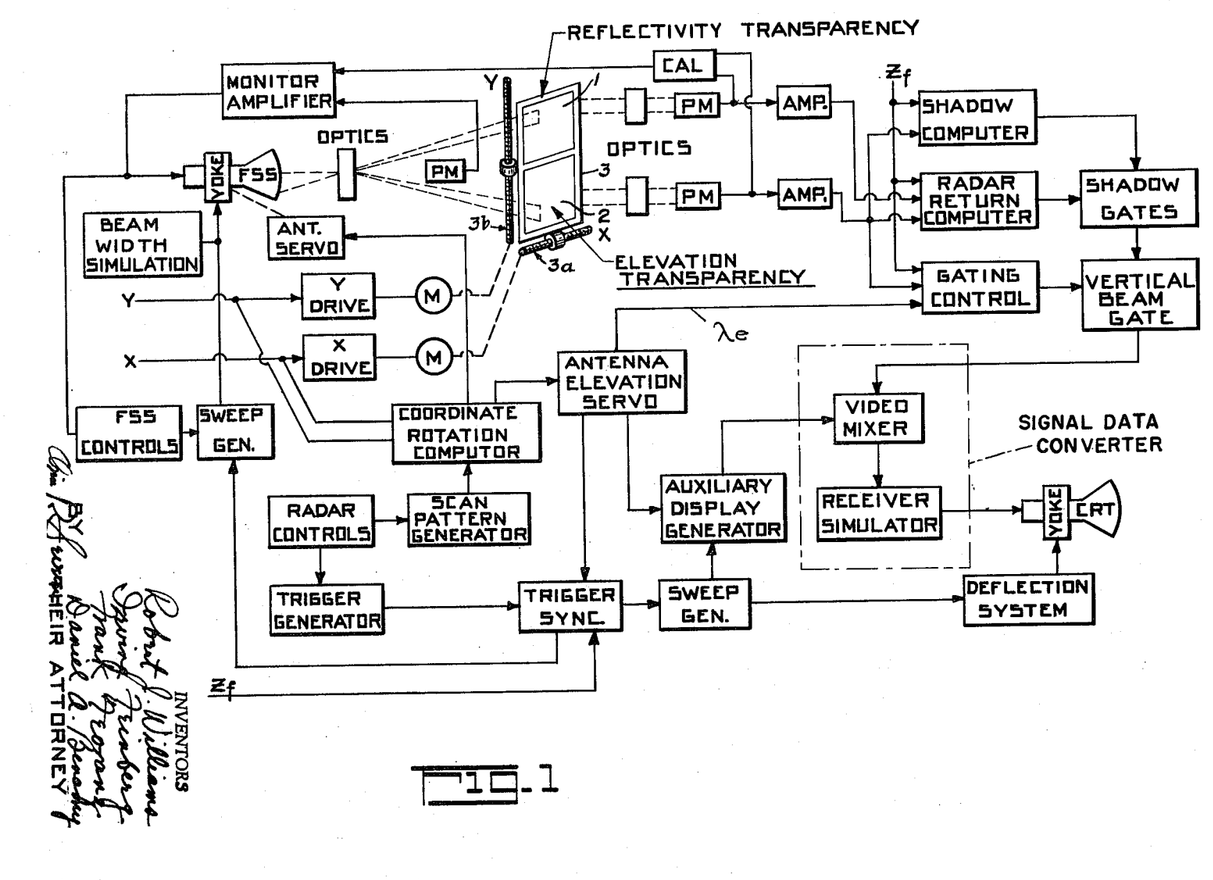
FIG. 1 is a block schematic and function illustration of the land mass radar return simulating system embodying the present invention.

A simplified block diagram of the basic simulating and training system is shown by FIG. 1. This diagram illustrates the generation of the radar signals and shows their application to a typical radar display cathode ray tube C.R.T. A flying-spot scanner tube FSS provides a reliable, readily controlled moving spot of source light and illuminates separately through a suitable split-image "optics" system as indicated, the two transparencies 1 and 2 that are mounted within a movable frame 3. The upper half, or "reflectivity transparency" is for radar return and the lower half, or "elevation transparency" is for terrain elevation. The transmitted light is focused on a corresponding photosensitive device and amplifier such as a photomultiplier PM, through suitable optics and the resultant video signals are processed by precise, compact, computing devices. Conventional components provide good flexibility and are more than adequate to provide simulation accuracies that will satisfy the requirements of the most modern operational radar systems.

Variations in radar returns due to changes in terrain contour are treated separately from radar returns due to cultural and topographic areas. Angle of incidence effects are derived from the terrain contour in conjunction with simulated aircraft altitude. The composite of these effects is then utilized to modulate the reflectivity returns in a realistic manner. Radar reflectivity effects are prepared without reference to terrain contour effects and embody only that data which is equivalent to the radar return characteristics of the ground, water areas or target complex areas and not modified by aircraft position or terrain shape. The aircraft position computer of a conventional flight simulator provides position signals $x$ and $y$ for moving the transparency through the indicated "$x$-drive" and "$y$-drive" servos and mechanical coupling $3a$ and $3b$ in horizontal and vertical directions so that the instantaneous position of the transparency agrees with the computed aircraft position.

Referring particularly to the transparencies, the reflectivity data is basic data stored on maps. Air target charts, target complex charts and other source materials are used. The map transparencies are inherently omni-directional. Thus the simulated flight may be made on any heading without compromise in validity of the simulation.

Figure 2:
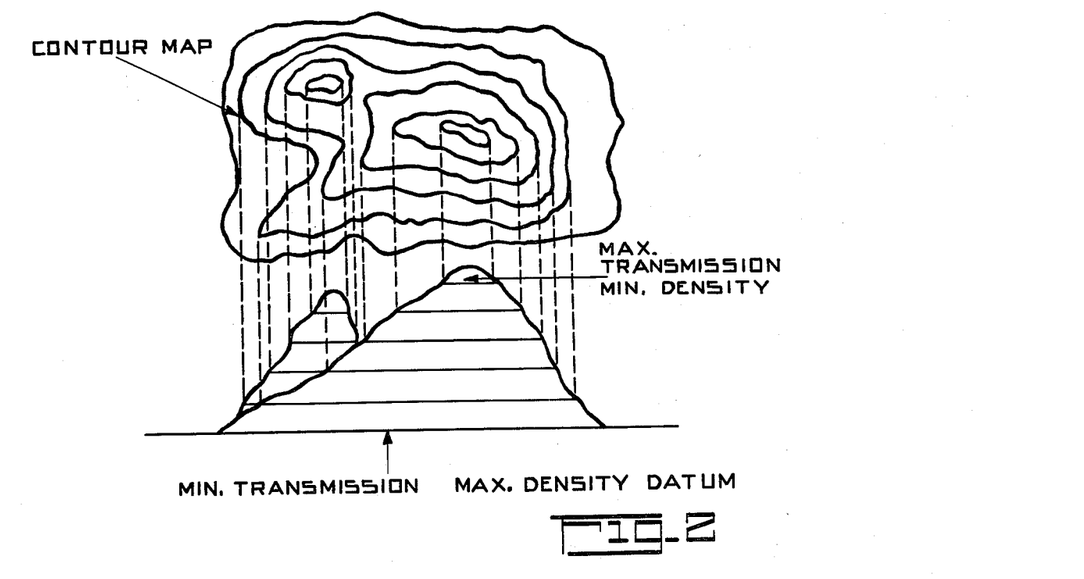
FIG. 2 is a diagram showing terrain elevation and contour representing data stored in the transparencies of FIG. 1.

The elevation transparency is a direct copy of the contour lines of the map, FIG. 2, expressed as the darkest gray level as a representative of sea level, and increasingly lighter shades as representative of increasing elevations. Gray levels are defined here as incremental levels of light transmission that lie between no-transmission and the maximum level that can be obtained without sacrifice of repeatability. Photographic emulsions respond to light levels in a logarithmic manner and densities are defined as logarithmic relationships. The gray-scale-versus-elevation-prediction rules are therefore set up as a percentage of light transmission through the transparency. Current conventional techniques as employed in the simulator provide a linear relationship between terrain elevations and the read-out of the elevations to an incremental scale of approximately 70 levels. FIG. 2 illustrates the manner in which continuous light data is transferred to light transmission units.

Returning to the system in general, FIG. 1, the amplified video signals from the transparencies are fed, together with a flight altitude signal $Z_f$, to a "radar return computer" as indicated, the output of which is in turn fed through shadow and vertical beam gating circuits, video mixer and "receiver simulator" to the display or cathode ray tube (C.R.T.). The "receiver simulator" is adapted to simulate specific characteristics of the type or model of radar receiver in question (receiver noise, "ground clutter," range attenuation and the like). This detail is not essential to understanding of the present invention and is therefore omitted to avoid complication of the disclosure. The receiver simulator also provides gating and variable gain control. This item together with the video mixer may be termed "signal data converter" which receives general input data for output to the C.R.T. The shadow gate is controlled by the "shadow computer" that in turn is energized and the $Z_f$ signal and the elevation transparency video signals, and the vertical beam gate is controlled by the gated elevation transparency video signals and the altitude signal $Z_f$ respectively. A standard flight computer produces signal $Z_f$.

The deflection system of C.R.T. introduces various effects, including those due to radar controls, antenna elevation and altitude, $Z_f$. The deflection system of the FSS tube is controlled as indicated by the antenna servo and also according to beam width simulation. The intensity of the FSS light beam is suitably controlled by a photosensitive device, such as a photomultiplier PM and a "monitor amplifier" connected to the input of FSS; also calibration of the transparency video output signals may be provided through the monitor amplifier as shown. The C.R.T. and FSS tubes are coordinated by a "coordinate rotation computer" for synchronized operation in well-known manner.

The operation of the shadow computer depends upon the existence of elementary geometrical relationships that determine when a shadow begins and when it ends.

At both the shadow start and end conditions, certain equalities are established. By having comparator circuits (sometimes referred to as Schmitt trigger circuits) set up to sense the instant of equality, means are provided for generating a gate which, when applied to an electronic switch, causes the terrain signal to go on and off.

Figure 3:
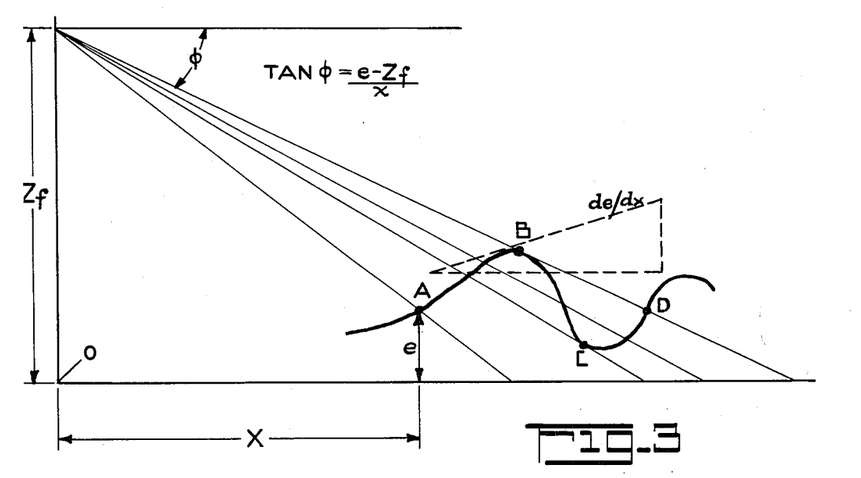
FIG. 3 is a graph illustrating shadow effect geometry.

Referring to the diagram of FIG. 3, let origin O correspond to the projection of the assumed airborne radar position on a horizontal plane at sea level. Let horizontal distances along the ground in the sea level plane be represented by $x$. Let $Z_f$ represent radar or flight altitude and $e$ represent terrain elevation.

Then the slope of the line-of-sight to any point A is $$\frac{e-Z_f}{x}$$

The slope of the terrain at any point A is $$\frac{de}{dx}$$

The shadow will start at B, which is a point of tangency at which the line-of-sight slope and the terrain slope are equal.

Therefore, prior to the start of the shadow, $$\frac{de}{dx} > \frac{e-Z_f}{x}$$

At the start of the shadow, $$\frac{e-Z_f}{x} \geq \frac{de}{dx}$$

The relationships for establishing the end of the shadow no longer require any further information as to the slope of the terrain $$\frac{de}{dx}$$

What is required is first: a memory or storage of the line-of-sight slope at point B as given by the shadow start equation. Let us call this quantity $$\frac{(e-Z_f)'}{x}$$

Secondly, there is required further information as to subsequent changes in the continuously computed line of sight slopes to scanned points in the shadow region.

Before the shadow ends, $$\frac{(e-Z_f)'}{x} > \frac{e-Z_f}{x}$$

At the end of the shadow, $$\frac{(e-Z_f)'}{x} \leq \frac{e-Z_f}{x}$$

At the conclusion of the shadow, the cycle of operation ends and the shadow start equations are again in effect.

Figure 3A:
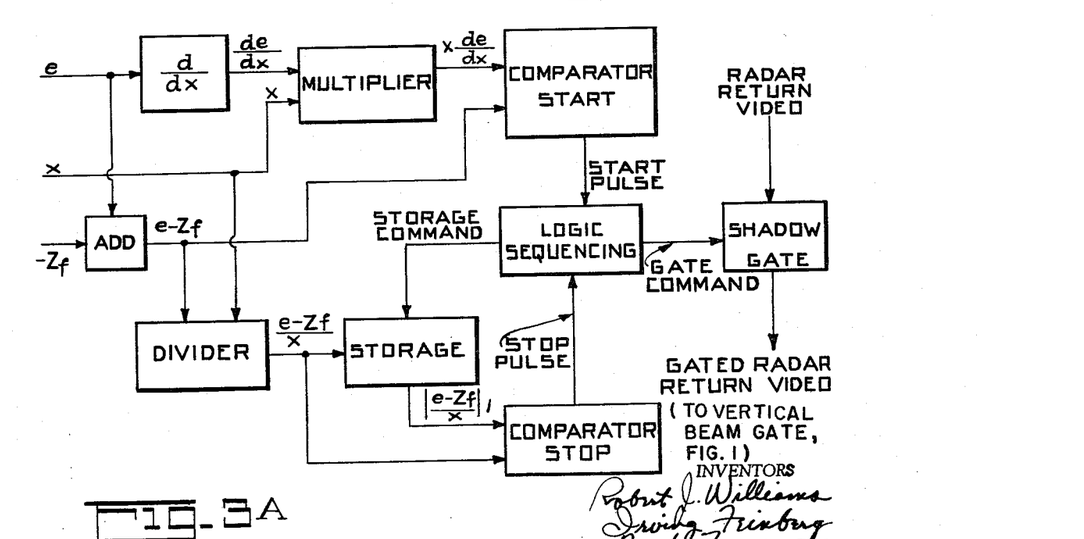
FIG. 3A is a block diagram illustrating the basic circuitry of the shadow computer.

FIGURE 3A is a system block diagram of a shadow computer that operates according to the geometrical concepts explained above.

The line-of-sight slope $$\frac{e-Z_t}{x}$$

which may be for convenience designated tan $\phi$, and the terrain slope $$\frac{de}{dx}$$

are determined by flight-computer and stored map data signal voltages representing the terrain elevation $e$, aircraft or radar altitude $Z_t$ and the ground distance $x$ to the given point A, FIG. 3. Referring now to FIG. 3A, the signal $e$ is differentiated with respect to time, giving $$\frac{de}{dt}$$

however since the factors $t$ and $x$ (considering the baseline of FIG. 3) can in effect be considered equivalents, the differentiation may be termed $$\frac{de}{dx}$$

This factor is multiplied by $x$ and the resultant signal $$x\frac{de}{dx}$$

fed to a comparator indicated "Comparator Start." The comparator also receives an algebraically summed signal $e-Z_t$ representing the aircraft altitude above point A, from the summer "Add." Accordingly, the comparator now can readily process the essential data, $$\frac{de}{dx} \text{ and } \frac{e-Z_t}{x}$$

i.e. tan $\phi$ to compare at each point the terrain slope with the line-of-sight slope. When the corresponding electrical quantities are equal or when tan $\phi$ exceeds $$\frac{de}{dx}$$

indicating start of the "shadow," the comparator produces a "start pulse" or trigger for the sequencing circuitry termed "Logic Sequencing." This circuitry in turn produces a "storage command" signal for immediate storage of the instant line-of-sight signal at point B, FIG. 1, now designated (tan $\phi$); and also a "Gate Command" signal for blocking off the main radar return video signal. Thus, the C.R.T. now indicates only a shadow for the area in question until unblocking occurs.

The "Comparator Start" effects unblocking to end the shadow and resume normal display at C.R.T. when the stored signal (tan $\phi$)' becomes less than or equal to the continuously computed tan $\phi$ signal during comparison. This latter signal is produced at a "Divider" fed by aforesaid signals $e-Z_t$ and $x$. The stop comparator at this point produces a "stop pulse" signal for the sequencing device that in turn causes cancellation of the stored signal (tan $\phi$)' and through a gate command signal unblocks the radar return video signals to the "vertical beam gate," FIG. 1, and in turn to the display tube C.R.T. Thus, normal display is resumed until another shadow condition occurs.

It will thus be seen that the shadow computer utilizes the continuously computed values, tan $\phi$ and $$\frac{de}{dx}$$

and the stored value (tan $\phi$)' efficiently and precisely to start and terminate shadow effects.

Figure 4:
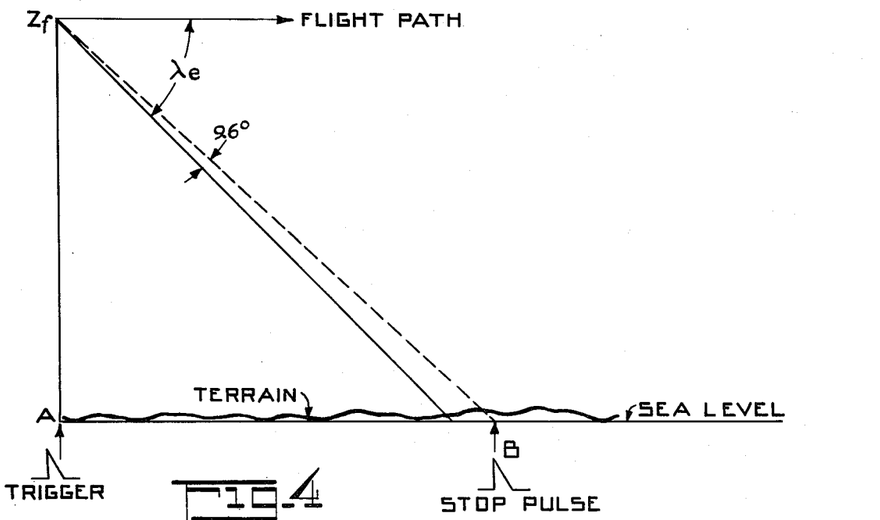
FIG. 4 is a diagram illustrating the geometry of the ground mapping gate.
Figure 4A:
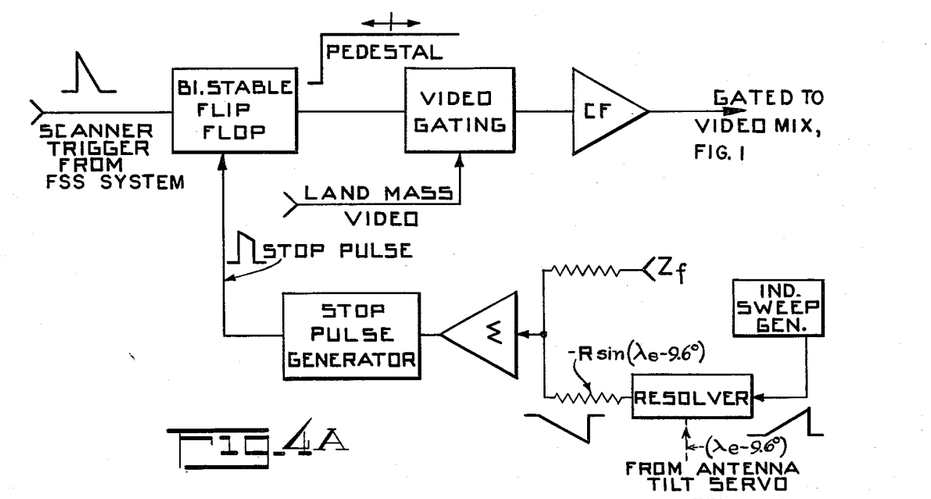
FIG. 4A is a circuit block diagram of the ground mapping gate.

FIGS. 4 and 4A illustrate the gating system for general ground mapping. FIG. 4 graphically represents, for example the aircraft in level flight at high altitude. The radar antenna tilt angle, $\lambda_e$ minus any offset angle such as 9.6° indicated in the ground mapping mode, defines a line intercepting the ground at a point depending on the aircraft altitude $Z_t$. The 9.6° angle is inherent in the antenna configuration and slightly modifies the tilt effect to increase the scanned area to point B. The total angle ($\lambda_e-9.6°$) defines the ground span covered by the radar antenna from a point directly beneath the aircraft to the point B as indicated by FIG. 4.

Referring now to FIG. 4A, two D.C. comparing signals representing respectively aircraft altitude $Z_t$ and Radar Range R times the sine of ($\lambda_e-9.6°$) are algebraically summed at the amplifier $\epsilon$. The signal $R \sin (\lambda_e-9.6°)$ is readily obtained as indicated by a resolver that is energized from the indicator sweep generator and adjusted according to the angle ($\lambda_e-9.6°$) by the antenna tilt servo, later referred to in more detail.

A "difference" signal thus obtained is of saw-tooth waveform and is fed to a "stop pulse generator." This consists primarily of a conventional "multiar" circuit which compares the amplitude of the saw-tooth difference signal to ground level, i.e. zero volts D.C. When the respective amplitudes representing aircraft altitude are equal, the multiar "fires" and generates a stop pulse to turn off a bistable "flip-flop." Firing of the multiar therefore in this case will take place on sign reversal, i.e. zero crossing.

The scanner trigger from the flying spot scanner system normally excites the flip-flop into one of its stable states, developing a "pedestal," i.e. enabling signal, which is fed to the video gating section. During the time that the pedestal is present, the video signals from the land mass transparencies are gated through the indicator circuitry. Thus the simulated radar scope as viewed shows proper representation of terrain. The stop pulse returns the flip-flop to its initial condition after a delay depending on the magnitude of the altitude signals $Z_t$ and $R \sin (\lambda_e-9.6°)$.

A cathode follower CF may be used for purposes of isolation or where a plurality of indicator tubes are required. The CF output is fed to the "video mixer," FIG. 1.

Figure 5:
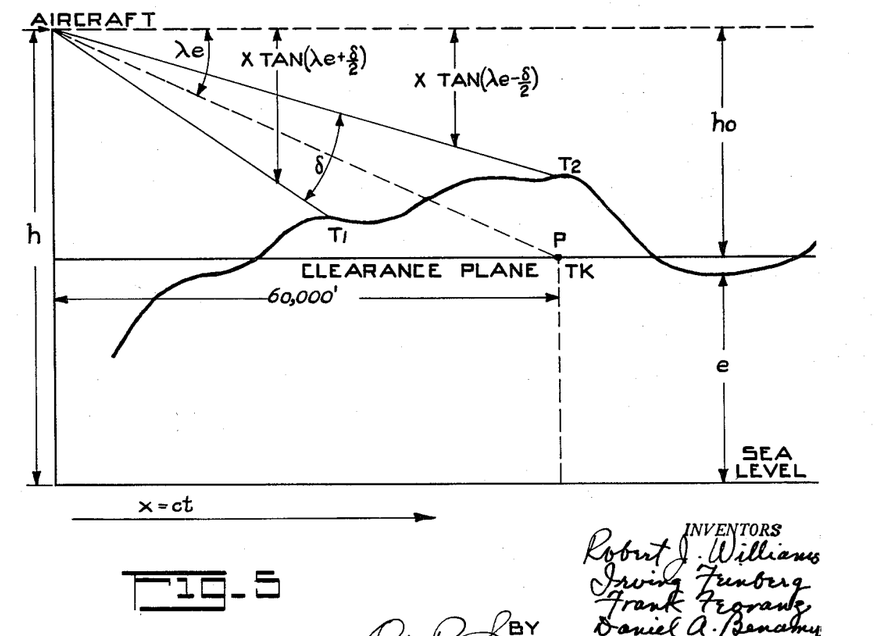
FIG. 5 is a terrain diagram illustrating the contour mapping mode geometry.

FIG. 5 graphically illustrates the technique of simulating contour mapping. In this mode of operation, the actual airborne radar utilizes monopulse techniques to determine ground returns which lie along a specific line of sight from the antenna. The product of the tangent of the line-of-sight angle and range establishes the means for determining a time gate. The present method of simulating contour mapping, FIGS. 5 and 6, depends upon setting up basic geographical relationships in rectangular coordinates.

The line-of-sight, i.e. the bisector of the beam angle, FIG. 5, may be considered as intersecting a datum or "clearance plane" at a point about 60,000 feet ground range, i.e. 10 nautical miles, from the aircraft position. This is the point designated P, at which the antenna is always automatically pointed during the flight and is located at sufficient distance in advance to give the pilot time for carefully observing the terrain. The corresponding time $T_k$ is continuously and automatically computed as the flight progresses and this value is used in determining the positions of terrain within the beam angle.

By further explanation, the clearance plane here represents a datum or arbitrary plane parallel to the flight path located a given distance, say 1500 feet, below the instant altitude of the aircraft. In FIG. 5 the aircraft is indicated as in level flight, hence the clearance plane is horizontal.

Figure 6:
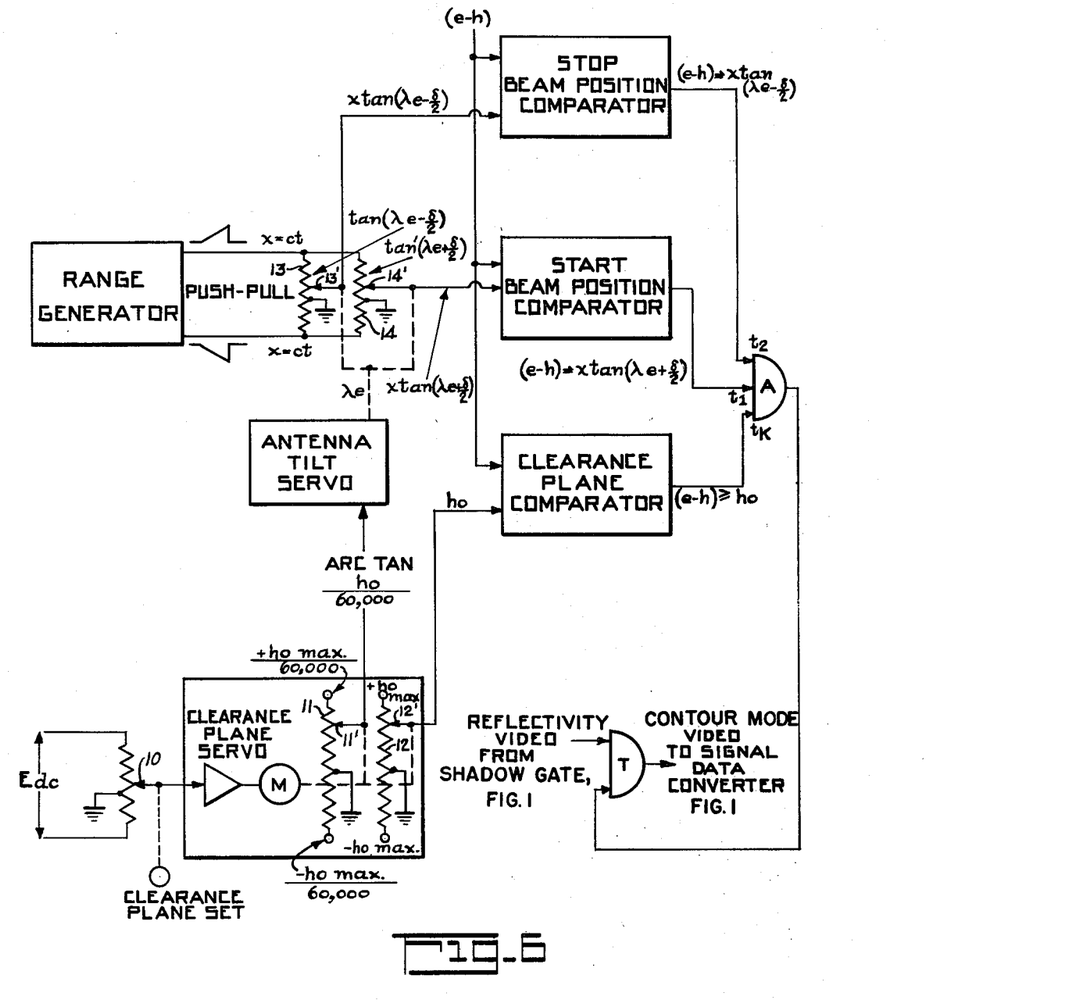
FIG. 6 is a combined block and schematic illustration of the contour mapping mode circuitry.

The "clearance plane set" is represented in FIG. 6 by a potentiometer arrangement whereby a D.C. signal representing a selected $h_0$ value may be derived at the slider contact 10 by the instructor or student for operating the "clearance plane servo." The servo motor M operates a pair of function potentiometers (hereinafter for brevity sometimes referred to as "pots") 11 and 12, both having intermediate ground taps and slider contacts 11' and 12' respectively. The pot 11 is energized at its terminals by voltage signals (representing the ratio $h_0$ max./60,000)

of opposite sense, and pot 12 is similarly energized by voltage signals $h_0$ max. of opposite sense. The function signals so derived represent arc tan $h_0$ max./60,000 and $h_0$ respectively, and these signals are fed respectively to both the "antenna tilt servo" the shaft angle of which represents $\lambda_e$, and to the "clearance plane comparator." The flight altitude symbol $h$ here is simply to indicate a D.C. signal whereas $Z_f$ indicates an A.C. signal. This convention is used throughout the description.

It will be seen that the tilt angle $\lambda_e$, FIG. 5, which positions the simulated elevation pattern in elevation, is properly an arc tangent function of the clearance plane set. Thus the antenna angle is automatically adjusted to sight on a point P on the clearance plane 60,000 feet away in ground range. For a given vertical $\lambda_e$ the antenna beam width $\delta$ can be represented in the rectangular coordinate system as $$\left(\lambda_e + \frac{\delta}{2}\right) - \left(\lambda_e - \frac{\delta}{2}\right)$$

These angles are represented as distances in voltage analog of time by multiplying the ground range $x$ to point P (the $T_k$ position) by the tangent of the two angles.

Hence, referring to FIG. 6 the antenna tilt servo is arranged to operate the sliders 13′ and 14′ of another pair of potentiometers 13 and 14 designed for the functions indicated. These pots are energized from the "range generator" by voltage signals $x$ of opposite sense (the horizontal distance $x$ may be considered as scanner time $ct$, i.e. the product of time and a constant.) The derived signals from these function pots therefore represent $$x \tan \left(\lambda_e - \frac{\delta}{2}\right)$$

and $$x \tan \left(\lambda_e + \frac{\delta}{2}\right)$$

respectively, and are fed to a "stop beam position comparator" and a "start beam position comparator" respectively for comparison with a $(e-h)$ signal.

Assuming now that $(e-h)$ exceeds or is equal to the tangent function signal in both instances, gating signals $t_2$ and $t_1$ are fed to an AND gate "A," together with a gating signal $t_k$ from the clearance plane comparator when $(e-h)$ is greater than or equals $h_0$.

Accordingly, gating takes place when both the following conditions obtain:

(1) The terrain must be above the clearance plane;
(2) The observations as to elevations must occur between the times $T_1$ and $T_2$, FIG. 5.

As in practice, a warning light may be energized when the terrain is represented as above the clearance plane to alert the pilot. When the terrain is below the clearance plane, no image appears on the scope.

Thus the elevation beam position comparators allow only those signals to go through which fall within the actual antenna beam pattern, so that these signals through the three-coincident AND gate control together with the reflectivity video signals, the video transmission gate T as indicated in FIG. 6 which in turn controls transmission of the video signals to the "signal data converter," FIG. 1.

Training in terrain avoidance is an important part of modern flight maneuvers, especially in the case of radar-equipped high speed military aircraft. Under conditions of night flying or poor visibility, the pilot must have indications of obstacles along the line of flight sufficiently in advance so that he can maneuver his plane to a safe clearance level. For this reason, terrain avoidance radar training is especially important in dive maneuvers at comparatively low altitude and for high-speed, low-level flying for approaching a target with minimum chance of early detection.

In practice, the antenna is locked "straight-ahead" and the radar scope shows the terrain elevation in vertical relation to the clearance plane which appears as a datum line on the scope. Hence, if the pilot has set his clearance plane for 1500 ft., there is no display on the indicator until his flight altitude is within 1500 ft. of the terrain. Also in practice, both the terrain avoidance and contour mapping modes make use of monopulse narrow fixed beam width, whereas the ground mapping mode (simulated in FIG. 4A) makes use of a (cosecant)² antenna pattern.

The mode of simulating terrain avoidance according to the present invention is essentially an extension of the contour mapping mode previously described with reference to FIGS. 5 and 6, to include an inclined clearance plane, as in simulation of aircraft dive or glide for example. In this mode, it should be noted that the clearance plane is always parallel to the flight vector or flight path, whereas in the contour mapping mode previously described, the clearance plane is normally horizontal.

Figure 7:
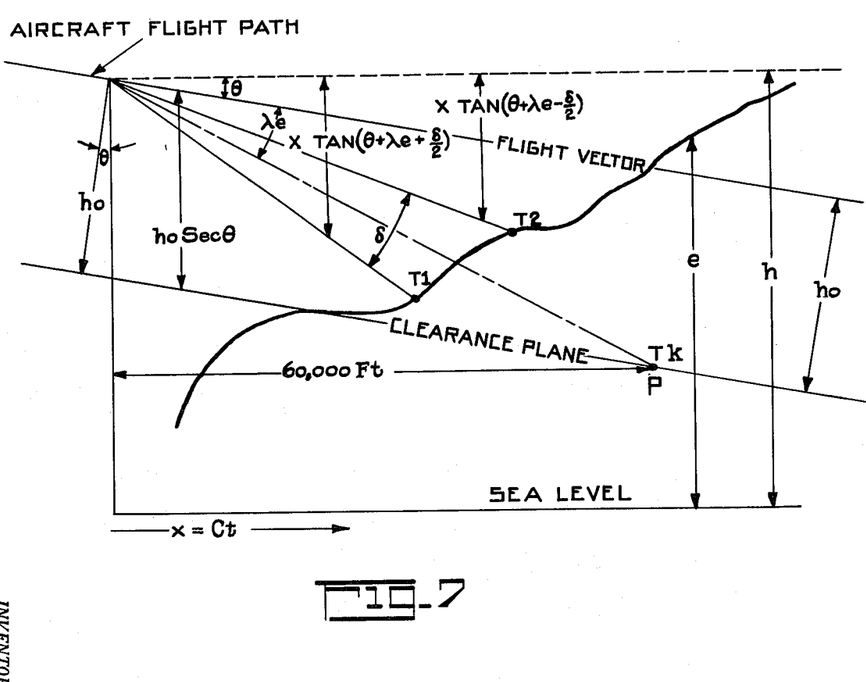
FIG. 7 is a terrain diagram illustrating terrain avoidance mode geometry.
Figure 8:
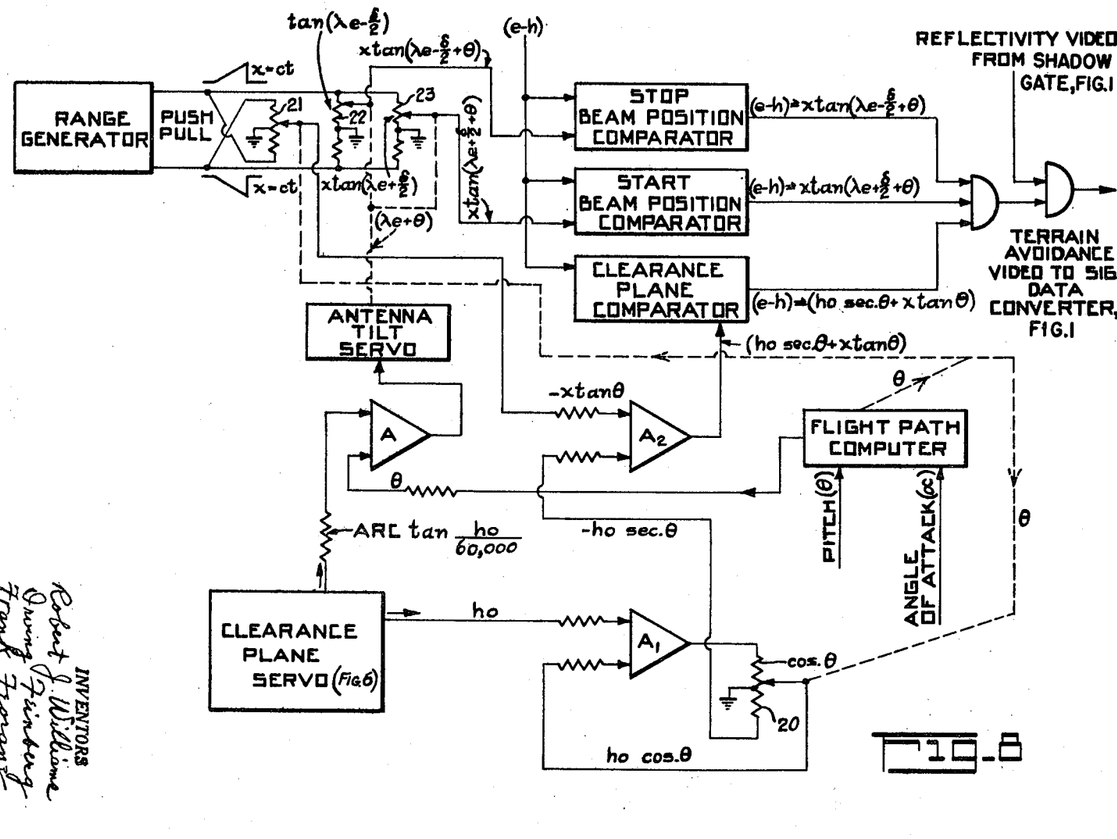
FIG. 8 is a combined block and diagrammatic illustration of the terrain avoidance mode circuitry.

FIGS. 7 and 8 indicate the somewhat more complex geometry that is involved as compared with FIGS. 5 and 6. Essentially, FIG. 7 represents the geometry of FIG. 5 rotated through the flight angle $\theta$. Since the elevation data is obtained from a linear time scan of the elevation map, this data is an instantaneous representation versus ground range $x$. The ground range can therefore be represented by a simple saw-tooth wave form as previously described.

Here again, FIG. 7, the simulated elevation pattern must be positioned according to the proper elevation angle $(\lambda_e + \theta)$ with respect to the earth's surface. This position amounts to the sum of the aircraft flight path angle plus the angle $\lambda_e$ computed from the intersection of the clearance plane with a point approximately 10 nautical miles ahead of the aircraft. The computed flight path angle $\theta$, represented by both a shaft angle for potentiometer adjustment and an electrical signal, is obtained from the flight path angle computer, FIG. 8, of a conventional flight simulator which takes into account the pitch angle and angle of attack of the simulated flight. The electrical signal $\theta$ is summed at amplifier A with the arc tangent function signal to control the antenna tilt servo.

As is shown in FIG. 7, the vertical distance between the flight path vector and the clearance plane is ($h_0$ sec $\theta$); hence in FIG. 8 ($-h_0$ secant $\theta$) is computed according to the values of $h_0$ and the angle $\theta$ by circuitry including the feedback amplifier $A_1$ and the cosine function potentiometer 20. The equation for the output voltage of a unity gain feedback amplifier is equal to $-h_0$, where $\beta = \cos \theta$. Hence the output voltage of the pot equals $(-h_0$ secant $\theta)$. This signal is summed at amplifier $A_2$ with a signal $(-x \tan \theta)$ from the range generator pot 21 to obtain an output signal $(h_0 \sec \theta) + (x \tan \theta)$. The slider of pot 21 is adjusted according to shaft angle $\theta$ from the flight path computer, and the derived signal is compared with the $(e-h)$ signal at the "clearance plane comparator" to obtain $T_k$ as in the contour mapping mode. The antenna tilt servo controls the function pots 22 and 23 so as to derive the function signals $$x \tan \left(\lambda_e - \frac{\delta}{2} + \theta\right)$$

and $$x \tan \left(\lambda_e + \frac{\delta}{2} + \theta\right)$$

respectively, for comparison with the $(e-h)$ signal as previously described. The operation of the comparators and gating are essentially the same as in FIG. 6, the main difference being the modifying effect of angle $\theta$ introduced by the antenna tilt servo and flight path computer.

For more precise simulation, true slant range may be computed. This is optional and may be added where a high degree of precision is required. This feature is not indicated in the general schematic lay-out of FIG. 1 but may readily be incorporated therein, as will be apparent from the relationship of the block labeled 9B to system blocks in FIG. 9A.

Figure 9:
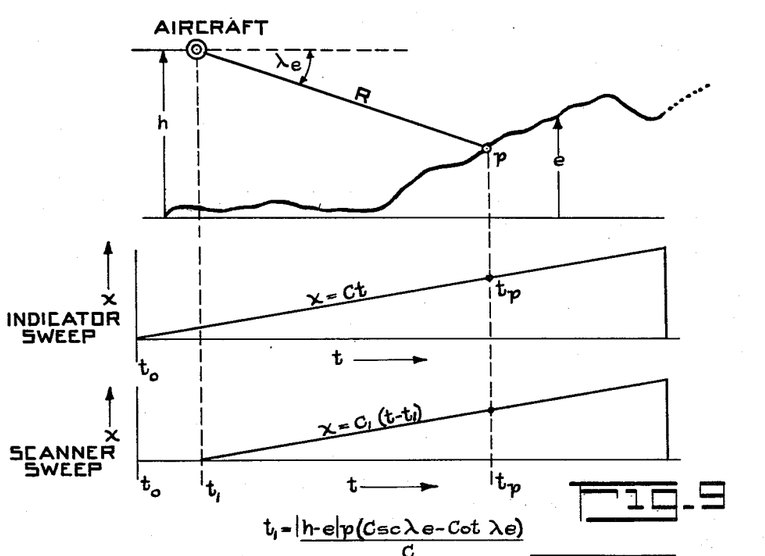
FIG. 9 illustrates graphically the true slant range geometry.
Figure 9A:
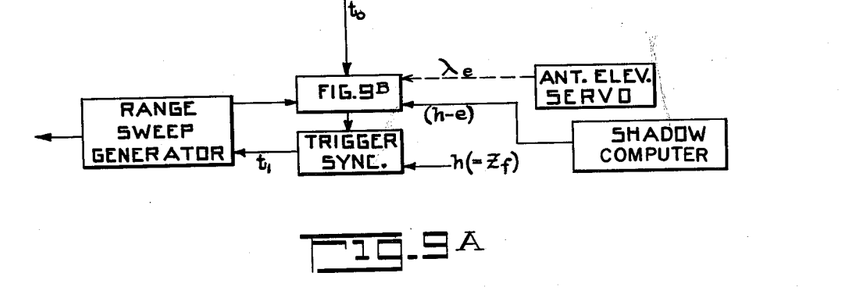
FIG. 9A is a block diagram illustrating the relationship of the true slant range computer to the general system.
Figure 9B:
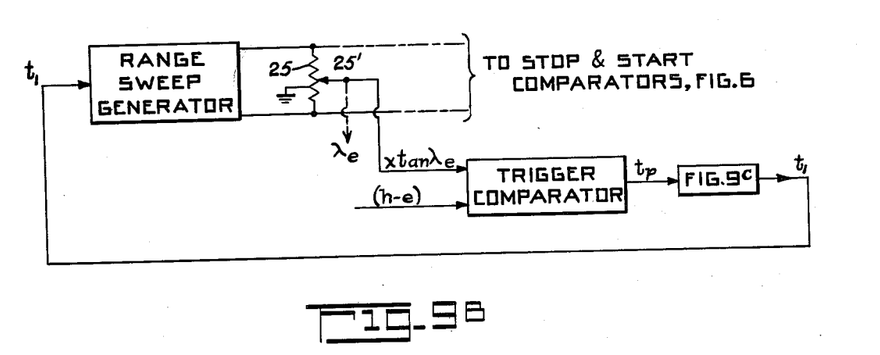
FIG. 9B is a block schematic diagram of a portion of circuitry indicated in FIG. 9A showing the origin of the $t_p$ and $t_1$ signals.

FIGS. 9, 9A, 9B, 9C and 9D illustrate the method and apparatus for computing the representation of true slant range, i.e. the distance from the aircraft to the line-of-sight intersection of terrain. FIG. 9 shows this intersection at point $p$ for the antenna tilt angle $\lambda_e$. In the simulating apparatus, the slant range is determined by computing the time scan along the $x$ axis to the projection of point $p$ thereon, and this value is then corrected.

Assuming now that the angle $\lambda_e$ is as indicated in FIG. 9, it will be seen that were the indicator sweep to start at the aircraft or zero position coincident with the scanner sweep, the point $p$ would be indicated closer then it should be as the sweep is computing a shorter distance. The amounts of antenna tilt and aircraft altitude are major factors in determining this error, the relative error diminishing with greater altitude and less antenna tilt, i.e. smaller depression angle $\lambda_e$.

The circuitry herein described is for the purpose of introducing a correction signal that, in effect, shifts the $x$ or time axis by starting the indicator sweep earlier by an amount tending to correct the computed range distance. It will be understood that although the error can be minimized, it cannot from a practical standpoint be entirely eliminated.

FIG. 9 illustrates graphically the time relation of the indicator sweep to the scanner sweep when the correction is applied. The indicator sweep is started at an advanced reference time $t_0$. After a computed time $t_1$ the scanner sweep starts so as to in effect relocate the time projection of point $p$ on the $x$ axis.

Figures 9C, 9D:
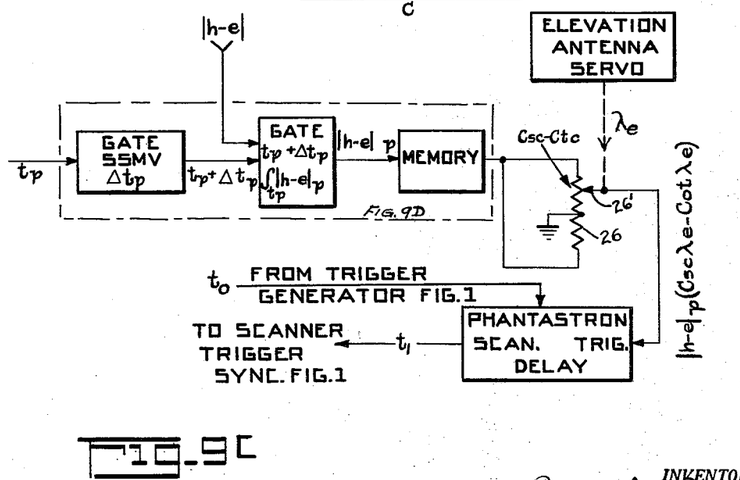
FIG. 9C is a block diagram of a portion of circuitry indicated in FIG. 9B comprising the true slant range computer.
FIG. 9D is a detail circuit diagram of circuitry indicated in FIG. 9C comprising the $(h-e_p)$ computer.
Figure 9D:
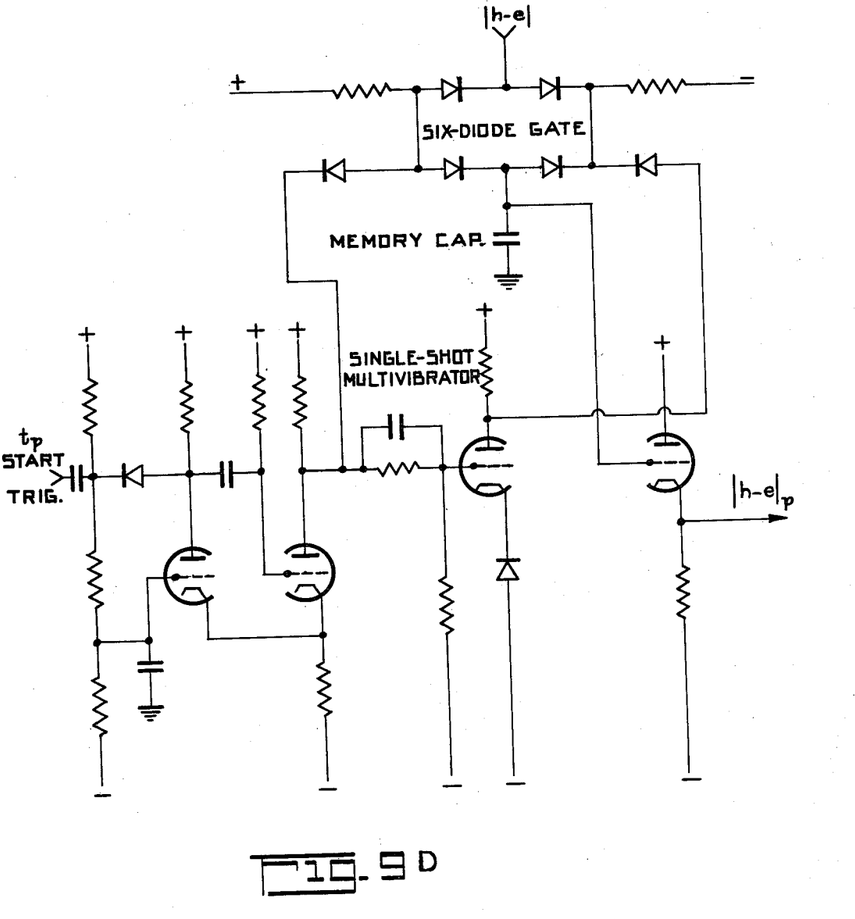

FIGS. 9C and 9D show the circuitry for simulating this effect. In following the description, it should be borne in mind that FIG. 9A incorporates FIG. 9B, which in turn incorporates FIG. 9C; the latter also represents by the first three blocks FIG. 9D.

FIG. 9B specifically is a modification of FIG. 6 to include true slant range computation. Here, an additional potentiometer 25 is used for computing the signal $t_p$ as presently described.

Referring again to FIG. 9, the time value $t_p$ at points $p$ depends on the relative aircraft altitude $h$, terrain elevation $e$ and antenna tilt angle $\lambda_e$. For present purposes, and assuming a comparatively narrow beam width, the equations of FIG. 6 for defining the antenna beam position may be simplified as $(e-h) \cong x \tan \lambda_e$. The conversion of the ground or $x$ coordinate video signals produced by the land mass scanner to a true slant range representation on the indicator is accomplished according to the equation $$t_1 = |h-e|_p [\csc \lambda_e - \cot \lambda_e]$$

which quite accurately locates point $p$ on the indicator by delaying the start of the scanner sweep by a time quantity $t_1$. (The convention $|h-e|$ is used to indicate absolute values or magnitude without reference to positive or negative sense; otherwise, the signals $(e-h)$ and $(h-e)$ indicate polarity sense.)

FIGS. 9A and 9B illustrate the mode of operation generally. The range generator of FIG. 6 energizes an additional function potentiometer 25 that is adjusted by the antenna tilt servo according to the angle $\lambda_e$. The derived signal at slider 25' representing $\tan \lambda_e$ is fed, together with signal $(h-e)$ to a trigger or "start beam" comparator as indicated, to produce the signal $t_p$, thus locating in time the point $p$ on the $x$ axis. This signal is fed to the circuitry of FIGS. 9C and 9D presently described and the resulting time correction signal $t_1$ is fed to the sweep generator above referred to.

The separate computation of $|h-e|_p$ requires sampling of $|h-e|$ and storing this information in a memory circuit indicated by block diagram in FIG. 9C and specifically shown by the memory capacitor, FIG. 9D. This stored value is then used to correct the start of the scanner sweep. The first scanner sweep will contain a material error which is corrected on subsequent sweeps by the slant range computer. Each sweep corrects any residual error on the previous sweep.

Referring to the specific circuitry of FIG. 9D, a six-diode gate is controlled by a single-shot "multivibrator" including two twin-tubes as indicated. The multivibrator is triggered by the $t_p$ signal derived from a start beam position comparator. The $|h-e|$ quantity for the computed point $p$ is continuously stored in the memory capacitor indicated. This quantity is multiplied, FIG. 9C, by $[\csc \lambda_e - \cot \lambda_e]$, referring to the equation above, by means of a function potentiometer 26 that is adjusted as shown according to $\lambda_e$ by the antenna tilt servo. The derived signal at slider 26' is used as a control voltage for the "phantastron" that in turn controls the delay of the scanner trigger. The phantastron receives a start signal from the trigger generator and produces a delayed output pulse at time $e_1$.

This pulse signal represented as $t_1$, is used as shown in FIGS. 9A and 9B for controlling the range sweep generator so as to correct the slant range computing error in the manner above described.

It should be understood that this invention is not limited to specific details of construction and arrangement thereof herein illustrated, and that changes and modifications may occur to one skilled in the art without departing from the spirit of the invention.

What is claimed is:

1. A simulating system for representing display of airborne radar return signals from terrain under surveillance having a flying spot scanner type of light source, a plurality of map transparencies with reflectivity and elevation terrain data arranged to be separately scanned by said source, radar return electronic computing means responsive jointly to flight computer signals representing respectively aircraft altitude, terrain elevation and ground range to define the assumed airborne radar position, and to video signals from said transparencies, and a radar display indicator responsive to resultant signals from said computing means for depicting said terrain, said computing means including a terrain shadow computer responsive to said signals for computing continuously the slope of the line-of-sight from the assumed radar position to a scanned point on the terrain and also the slope of the terrain at that point, said shadow computer producing electrical signals representing said line-of-sight and terrain slopes respectively, means for comparing said slopes signals, means for storing the then computed line-of-sight signal when said line-of-sight and terrain slopes signals become equal and for blocking the video signals to said display indicator for representing the start of a terrain shadow condition, and means for comparing the aforesaid stored line-of-sight signal and the continuously computed line-of-sight signal for unblocking said video signal to represent end of the shadow condition when said stored and continuously computed line-ofsight slopes signals become equal.

2. A simulating system for representing display of airborne radar return signals from terrain under surveillance having a flying spot scanner type of light source, a pair of map transparencies with terrain reflectivity and contour data respectively arranged to be separately scanned by said source, radar return electronic computing means responsive jointly to electrical flight computer signals representing respectively aircraft altitude, terrain elevation, and ground range to define the assumed airborne radar position, and to video signals from said transparencies, and a radar display indicator responsive to resultant signals from said computing means for depicting said terrain, said computing means comprising means for continuously computing the slope of the line-of-sight from the assumed radar position to a scanned point on the terrain and also the slope of the terrain at that point, said computing means producing electrical signals representing respectively said line-of-sight and terrain slopes, a first comparator for comparing said slope signals and for producing a "shadow start" pulse when the terrain slope is represented as being equal to or greater than the line-of-sight slope, means responsive to said start pulse for causing both storage of the then computed line-of-sight signal and for blocking the video signals to said display indicator to represent the start of a terrain shadow condition, and a second comparator for continuously comparing said stored signal and the continuously computed line-of-sight signal for producing a "shadow stop" pulse, said last-named means also being responsive to said stop pulse for cancelling the stored signal and for unblocking the video signals to terminate said terrain shadow condition.

3. A simulating system as specified in claim 1 wherein the shadow computer includes means for producing "shadow start" and "shadow stop" electrical signal pulses respectively in accordance with operation of the storing and the two comparing means, and electronic gating means responsive to said pulses for blocking and unblocking the video display signals for representing the start and end of shadow effects.

4. A simulating system as specified in claim 1 having means for producing a re-set signal for the storage means in response to unblocking of the video signals.

5. A simulating system as specified in claim 1 having two map transparencies with stored reflectivity and elevation terrain data respectively mounted as a unit for relative movement with respect to a single spot scanner, and servo means responsive to flight computer signals representing simulated flight position adapted to cause said relative movement.

6. A simulating system as specified in claim 1 adapted for training in terrain contour observation and mapping having means for controlling the flying spot scanner to represent antennae beam width, means for deriving an electrical signal representing a function of the antenna tilt angle and a signal representing the distance ($h_0$) of a horizontal datum or clearance plane beneath the flight path, said tilt angle being formed by the intersection of the line-of-sight and the clearance plane at a predetermined ground distance along said plane, servo means responsive to said function signal for in turn deriving control signals representing combined functions of said angle, ground range and the antenna beam angle, a pair of comparator means for separately comparing certain of said control signals with a signal ($e-h$) representing distance from the simulated flight path to terrain at a scanned point, other comparator means for also comparing the ($e-h$) signal with the $h_0$ signal, and gating means responsive to the comparator output signals for passing the video signals for display of terrain within the limits of the antennae beam angle, and for blocking the video signals where the terrain is represented as outside the beam limits, said gating means also blocking said video signals when the clearance plane is represented as above scanned terrain.

7. A simulating system as specified in claim 1 for training in ground mapping wherein the radar antennae beam angle is represented by modified operation of the flying spot scanner, and the beam angle extends approximately from a point directly beneath the aircraft to a terrain point in advance thereof, and the simulated flight path is horizontal and at material altitude, having means for summing input signals representing respectively aircraft altitude and a combined function of ground range and antenna tilt angle, pulse producing means responsive to the output of said summing means for producing a "stop" pulse representing the advance limit of the beam, and a bi-stable device responsive to scanner trigger pulses for causing normal gating of the video signals to the display indicator in an initial state of said device, and responsive to said stop pulse for blocking the video signals in the other state, said stop pulse returning said device to its initial state after a time interval depending on the magnitude of said input signals whereby the indicator display represents terrain solely within the beam angle.

8. A simulating system for representing airborne radar return display of terrain for training in contour mapping comprising an optical system having a pair of transparencies representing reflectivity and elevation terrain data respectively adapted to be separately scanned by a light source, electronic means responsive to the light transmitted from said transparencies for producing video signals for a display indicator, means for producing respectively a signal representing the antenna tilt angle and a signal representing the position of a horizontal datum or "clearance plane" relative to the horizontal flight path, said signal producing means representing the line-of-sight of the antenna angle as intersecting the clearance plane at a predetermined and fixed ground range from the aircraft, means for producing ground range timing pulses, means energized by said pulses and controlled according to the antenna tilt signal for producing signals representing combined functions of range tilt angle and beam width, means for producing a signal representing the vertical distance from the flight path to the scanned line-of-sight point on the terrain, "stop" comparator means responsive jointly to one of said function signals and said vertical distance signal for representing one limit of the beam, "start" comparator means responsive jointly to the other of said function signals and said vertical distance signal for representing the other limit of the beam, other comparator means responsive jointly to said clearance plane signal and said vertical distance signal for representing the position of terrain with respect to the clearance plane, said comparator means adapted to produce respectively gate control signals, and a gate responsive jointly to said control signals for controlling said video signals so as to represent terrain within said beam and above said clearance plane.

9. A simulating system as specified in claim 8 wherein the means for producing the antenna tilt signal comprises means for producing a signal representing a set vertical distance of the clearance plane below the flight path, servo means responsive to said signal for controlling a pair of function generators, one of said generators producing a signal representing the antenna tilt angle with respect to a point on said clearance plane a predetermined ground distance from the aircraft, and the other generator producing the clearance plane position signal.

10. A simulating system for representing airborne radar return display of terrain for training in terrain avoidance technique comprising an optical system having a pair of transparencies representing reflectivity and elevation terrain data respectively adapted to be separately scanned by a light source, electronic means responsive to the light transmitted from said transparencies for producing video signals for a display indicator, means for producing a signal representing, for horizontal flight, a function of the antenna tilt angle with respect to the position of a datum or "clearance plane" parallel to the flight path, means for producing another signal representing a set distance of the datum plane beneath the flight path, servo means responsive to said function signal and to a signal representing the computed flight path angle for in turn producing a signal representing oriented antenna tilt, means for producing ground range timing pulses, means energized by said pulses and controlled according to the oriented antenna tilt signal for producing comparing signals representing combined functions of range, oriented tilt angle, radar beam elevation width and flight path angle, means also energized by said pulses and controlled according to the computed flight path angle for producing a computer signal representing a combined function of range and flight angle, means responsive to the aforesaid said datum plane signal and to the computed flight path angle signal for producing another computer signal representing a combined function of datum plane position and flight angle, means responsive to the aforesaid computer signals for producing a signal representing vertical distance from flight path to datum plane, means for producing a signal representing the vertical distance from the flight altitude to the scanned line-of-sight point on the terrain, a first comparator means responsive jointly to said vertical distance signal and one of said comparing signals for producing a signal for defining one limit position of the radar beam with respect to terrain, a second comparator means responsive jointly to said vertical distance signal and the other comparing signal for producing a signal for defining the other limit position with respect to terrain, a third comparator means responsive jointly to said vertical distance signal and said vertical distance-to-datum plane signal for producing a signal for defining the relation of terrain elevation and clearance plane at the radar beam line-of-sight, and gating means responsive jointly to all said defining signals for controlling the video signals so that terrain is displayed within the beam limits when the clearance plane is represented as lower than the scanned terrain point.

11. A simulating system for representing airborne radar return display comprising an optical system having flying spot scanner means, a pair of transparencies with reflectivity and elevation terrain data respectively arranged to be scanned separately and means responsive to light from said transparencies for producing video signals, computing means for representing radar return effects on a display indicator, said computing means having means for determining true slant range distance from the assumed aircraft position to a scanned point on the terrain comprising means for producing timing pulses for the flying spot scanner, means controlled by and in accordance with said pulses and assumed antenna tilt angle for producing a function signal representing the vertical distance from the flight path to terrain, means responsive to said function signal and flight computer signals for producing a computed signal representing the vertical distance from flight path to said scanned terrain point, means jointly responsive to said computed signal and to a signal representing antenna tilt angle for producing a range correction signal, and delay means responsive to said correction signal and a signal from the display indicator sweep for producing a sweep timing correction signal, said signal being applied to the scanner sweep for delaying said sweep whereby the displayed indicator range corresponds to the scanned transparency range.

12. A simulating system for representing airborne radar return display comprising an optical system having flying spot scanner means, a pair of transparencies with reflectivity and elevation terrain data respectively arranged to be scanned separately and means responsive to light from said transparencies for producing video signals, computing means for representing radar return effects and gating means responsive to said computing means for controlling transmission of video signals to a display indicator, said computing means having means for determining true slant range distance from the assumed aircraft position to a scanned point on the terrain comprising a range scanner sweep generator for producing timing pulses, means jointly responsive to said pulses and a signal representing antenna tilt angle for producing a function signal representing the vertical distance from the flight path to terrain, means for comparing said function signal and a flight computer signal also representing said vertical distance to produce a timing signal determining the range position of the scanned terrain point, computing means responsive jointly to said timing signal, the aforesaid flight computer signal and to a signal representing antenna tilt angle for producing a range correction signal, and delay means responsive to said correction signal and a signal from the display indicator sweep for producing a sweep timing correction signal, said signal being applied to the scanner sweep for delaying said sweep according to the magnitude of the range correction signal whereby the displayed indicator range corresponds to the scanned transparency range.

13. A simulating system for representing airborne radar return display comprising an optical system having flying spot scanner means, a pair of transparencies with reflectivity and elevation terrain data respectively arranged to be scanned separately and means responsive to light from said transparencies for producing video signals, computing means responsive to flight computer signals and to a signal representing antenna tilt angle for representing radar return effects and gating means responsive to said computing means for controlling transmission of video signals to a display indicator, said computing means having means for determining true slant range distance from the assumed aircraft position to a scanned point on the terrain comprising a range scanner sweep generator for producing timing pulses, means jointly responsive to said pulses and a signal representing antenna tilt angle for producing a function signal representing the vertical distance from the flight path to terrain, trigger means for comparing said function signal and a flight computer signal also representing said vertical distance to produce a timing signal determining the range position of the scanned terrain point, computing means responsive jointly to said timing signal and the aforesaid flight computer signal for producing a computed signal representing the vertical distance from flight path to said scanned terrain point, means for storing said computed signal, function generating means jointly responsive to said stored signal and to a signal representing antenna tilt angle for producing a range correction signal, and delay means responsive to said correction signal and a signal from the display indicator sweep for producing a sweep timing correction signal, said signal being applied to the scanner sweep for delaying said sweep according to the magnitude of the range correction signal whereby the displayed indicator range corresponds to the scanned transparency range.

References Cited in the file of this patent

UNITED STATES PATENTS

| | | |
|---|---|---|
| 2,406,751 | Emerson | Sept. 3, 1946 |
| 2,737,730 | Spencer | Mar. 13, 1956 |
| 2,788,588 | Lindley | Apr. 16, 1957 |
| 2,824,271 | Anderson et al. | Feb. 18, 1958 |
| 2,941,311 | Rosenfeld et al. | June 21, 1960 |